United States Patent
Gross et al.

(10) Patent No.: US 6,649,266 B1
(45) Date of Patent: Nov. 18, 2003

(54) SUBSTRATES PROVIDED WITH A MICROSTRUCTURED SURFACE, METHODS FOR THE PRODUCTION THEREOF, AND THEIR USE

(75) Inventors: Frank Gross, St. Ingbert (DE); Martin Mennig, Quierschied (DE); Peter W. Oliveira, Saarbruecken (DE); Helmut Schmidt, Saarbruecken-Guedingen (DE); Stefan Sepeur, Wadgassen-Schaffhausen (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/959,023
(22) PCT Filed: Apr. 14, 2000
(86) PCT No.: PCT/EP00/03425
  § 371 (c)(1),
  (2), (4) Date: Oct. 15, 2001
(87) PCT Pub. No.: WO00/62942
  PCT Pub. Date: Oct. 26, 2000

(30) Foreign Application Priority Data
Apr. 16, 1999 (DE) .......................................... 199 17 366

(51) Int. Cl.[7] ........................... B32B 17/00; B32B 9/04; B05D 5/00; B05D 3/12
(52) U.S. Cl. ....................... 428/410; 428/409; 428/429; 428/447; 428/450; 428/696; 427/276; 427/355; 427/387; 427/256
(58) Field of Search ............................... 427/355, 356, 427/357, 397.7, 372.2, 256, 387, 276; 428/446, 447, 450, 409, 426, 428, 429, 696, 410; 106/286.1, 286.2, 286.4, 286.5, 286.6, 287.1, 287.12, 287.13, 287.14, 287.15, 287.16, 287.17, 287.18, 287.19

(56) References Cited

U.S. PATENT DOCUMENTS
6,020,026 A * 2/2000 Birch et al. .................. 427/287
6,361,870 B1 * 3/2002 Steffl et al. .................. 428/447
2002/0192472 A1 * 12/2002 Metz et al. .................. 428/426

FOREIGN PATENT DOCUMENTS
WO  WO 99/03941  * 1/1999 ....... C09D/183/114

* cited by examiner

Primary Examiner—Robert Dawson
Assistant Examiner—Michael J Feely
(74) Attorney, Agent, or Firm—Heller Ehrman White & McAuliffe LLP

(57) ABSTRACT

Substrates provided with a microstructured surface have a surface layer which (a) comprises a composition comprising condensates of one or more hydrolysable compounds of at least one element M from main groups III to V and/or transition groups II to IV of the Periodic Table of the Elements, at least some of these compounds containing not only hydrolysable groups A but also non-hydrolysable, carbon-containing groups B and the total molar ratio of groups A to groups B in the parent monomeric starting compounds being from 10:1 to 1:2, from 0.1 to 100 mol % of the groups B being groups B' containing on average from 5 to 30 fluorine atoms which are attached to one or more aliphatic carbon atoms distanced from M by at least two atoms, and (b) has a microstructuring of such kind that the contact angle with respect to water or hexadecane is at least 5° higher than the contact angle of a corresponding smooth surface.

Figure 1:
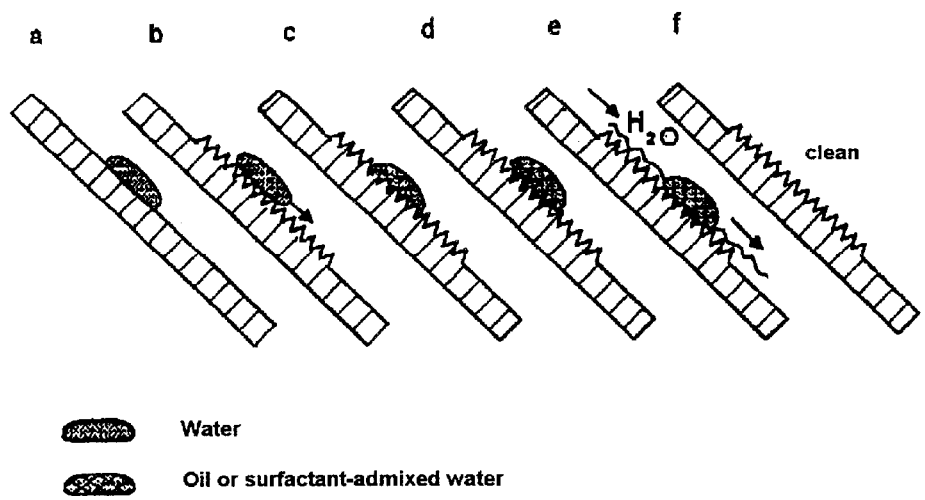

The substrates provided with a microstructured surface are particularly suitable as transparent or translucent easy-to-clean systems.

11 Claims, 1 Drawing Sheet

SUBSTRATES PROVIDED WITH A MICROSTRUCTURED SURFACE, METHODS FOR THE PRODUCTION THEREOF, AND THEIR USE

The present invention relates to substrates provided with a microstructured surface, to methods of producing them, and to their use as what are known as easy-to-clean systems having dirt repellency properties.

The cleaning of surfaces is time-consuming and costly, and there is therefore great economic interest in giving surfaces dirt repellency properties. Adhesion mechanisms are generally governed by surface-energy parameters between the two contacting surfaces. As a general rule, the systems attempt to lower their free surface energy, generally by means of polar or chemical interactions. Where the free surface energies between two components are already inherently very low, it may generally be assumed that the adhesion between these two components will be weak, since the sum of the low free surface energies is low. What is important in this case is the relative lowering of the free surface energy. In the case of pairings with a high and a low surface energy, a very important factor is the possibilities for interaction. For example, when water is applied to hydrophobic surfaces, it is not possible to induce any marked lowering of the surface energy. This is evident from the fact that the wetting (determination of the surface angle $\Theta$ at the triple point) is poor. Perfluorinated hydrocarbons, such as Teflon, have a very low surface energy but at the same time have virtually no possibilities of interaction with any other substances whatsoever, whether they be polar or non-polar. Accordingly, hardly any components whatsoever adhere to such surfaces, and components which have deposited on such surfaces can be removed again very easily. This dirt repellency effect is also termed the easy-to-clean effect.

Nevertheless, such arrangements do not make it possible to suppress the van der Waals interactions, which generally are always active. Accordingly, the adhesion of a component to such a surface is defined substantially by the contact area: in other words, the smaller the contact area, the less the adhesion.

Nature makes use of this phenomenon in order to achieve very low levels of adhesion with respect to water. Thus cabbage leaves, for example, or else fruit, are covered by small wax bumps which, in the non-wetting case, as is the case with wax, very greatly reduce the van der Waals contact area of a water droplet and thus generally cause the water droplets to roll off. Where particles of dirt or dust are enclosed in these water droplets, they roll off too. Faced with wetting components such as oils or surfactants, however, such surfaces react conversely: as a result of the enlargement of the surface, the van der Waals interface is very greatly enlarged and the adhesion is increased. For this reason, such arrangements cannot be used in practice as easy-to-clean systems, since in the face of fats and oils, which cause strongly adhering soiling, they are completely unsuitable and rapidly become soiled specifically on account of their large area. For this reason, the "lotus effect" (wax excretions of this kind occur on lotus leaves as well), which has been widely discussed in recent times, is incapable of solving this problem. Moreover, the abrasion resistance would be inadequate for practical purposes.

The object of the present invention is to furnish substrates provided with a microstructured surface which exhibit dirt repellency properties even with respect to wetting components such as oils, fats or surfactants and which can be used in practice as easy-to-clean systems.

The invention provides substrates which are provided with a microstructured surface and whose surface layer
  (a) comprises a composition comprising condensates of one or more hydrolysable compounds of at least one element M from main groups III to V and/or transition groups II to IV of the Periodic Table of the Elements, at least some of these compounds containing not only hydrolysable groups A but also non-hydrolysable, carbon-containing groups B and the total molar ratio of groups A to groups B in the parent monomeric starting compounds being from 10:1 to 1:2, from 0.1 to 100 mol % of the groups B being groups B' containing on average from 5 to 30 fluorine atoms which are attached to one or more aliphatic carbon atoms distanced from M by at least two atoms, and
  (b) has a microstructuring of such kind that the contact angle with respect to water or hexadecane is at least 5° higher than the contact angle of a corresponding smooth surface.

The invention further provides a method of producing such substrates provided with a microstructured surface, characterized in that either
  (a) the coating composition applied to the substrate for the surface layer, before or during its drying and/or curing, is embossed with an embossing die which has a non-polar and/or low-energy surface, or
  (b) the surface-layer composition includes nanoscale inorganic particulate solids or agglomerates having a particle size of at least 50 nm.

The substrates of the invention provided with a microstructured surface are suitable for use as easy-to-clean systems and, even when soiled by oily, fatty or surfactant substances, can be entirely regenerated again by simple rinsing with plain water. A further substantial advantage is that transparent or translucent surface layers can be produced.

FIG. 1 shows the adhesion properties of different substances on a surface as a function of the composition and structure. The unhatched droplets represent a water droplet without constituents and the hatched droplets represent oil or surfactant-admixed water.

Accordingly, FIG. 1 shows that a water droplet adheres to a hydrophobic surface (a) but rolls off from a microstructured hydrophobic surface (b). An oil or surfactant/$H_2O$ droplet adheres very firmly to a microstructured hydrophobic surface and cannot be removed with water (c). In contrast, an oil or surfactant/$H_2O$ droplet adheres more weakly (d) to a microstructured surface of the invention and can be removed easily with plain water (e). In (f) a clean surface is shown.

By a microstructured surface is meant here, in general terms, a surface which, within a small observed two-dimensional element, is not smooth and even but instead has elevations (pixels) or indentations. For example, in each square millimeter of surface area there may be several thousand to several million pixels having a structural height of, for example, 20 nanometers or more up to one or more (e.g. 4) micrometers (measured by atomic force microscopy—AFM). The pixel spacing in this case may be, for example, from 50 to 100 or several hundred nm. Alternatively, for example, the microstructuring may be in the form of whiskers protruding from the surface.

Wetting is the ability of liquids to form an interface with solids. The wetting tendency may be derived from the contact angle formed between liquid and solid. The larger the contact angle, the lower the tendency of the liquid to wet the solid.

The surface of the substrates of the invention has a microstructuring of such kind that the contact angle both with respect to water and with respect to hexadecane is at least 5°, preferably at least 10°, higher than the contact angle of a corresponding smooth surface. In this case, the contact angle of the microstructured surface with respect to water is preferably at least 120°, while the contact angle with respect to hexadecane is preferably at least 70°. In accordance with the invention it is, surprisingly, possible to achieve contact angles with respect to water of up to 170° or more and at the same time to achieve hitherto unattained contact angles with respect to hexadecane of up to 120° or more.

The coating composition used in accordance with the invention may be applied to virtually any desired substrate. Examples include metals, glass, wood, paper, textiles, carpets, ceramic, plastics, but also building materials such as plasters, screeds, cements, putties, bricks, (natural) stone, porous building materials, insulating materials, and bulk products, powders, granules, etc. Examples that may be mentioned of metals include copper, aluminium, brass, iron and zinc. Particularly noteworthy among the polymers used as plastics are. transparent polymers such as polycarbonate, polymethyl methacrylate, polyacrylates, polyethylene terephthalate, and all other industrial thermoplastics, thermosets and elastomers, and also films. Also suitable, of course, are surface-treated (e.g. painted or sandblasted) substrates for the production of microstructured surfaces, examples being painted domestic appliances or medical instruments. The coating composition is applied preferably to smooth surfaces, although the microstructuring may also be generated on rough substrate surfaces, i.e. those with their own structure, when the surface layer of the invention forms an overstructure.

Particularly suitable coating compositions are the compositions described in WO 92/21729. The coating compositions and polycondensates and their preparation described in that application are hereby expressly incorporated by reference. Preferably, however, the fluorinated starting compounds are not added, as described therein, following the formation of precondensates from non-fluorinated starting compounds; instead, the starting compounds are preferably conjointly hydrolysed and condensed.

The hydrolysable starting compounds of at least one element M from main groups III to V and/or transition groups II to IV of the Periodic Cable of the Elements that are used to prepare the coating composition are preferably compounds of Si, Al, B, Pb, Sn, Ti, Zr, V or Zn, especially those of Si, Al, Ti or Zr, or mixtures of two or more of these elements. On this point it is noted that it is of course possible to use other hydrolysable compounds as well, especially those of elements from main groups I and II of the Periodic Table (e.g. Na, K, Ca and Mg) and of transition groups V to VIII of the Periodic Table (e.g. Mn, Cr, Fe and Ni). Hydrolysable compounds of the lanthanides may also be used. Preferably, however, the last-mentioned compounds account for not more than 20 mol % and in particular not more than 10 mol % of the total hydrolysable monomeric compounds used. When highly reactive hydrolysable compounds (e.g. aluminium compounds) are used, it is advisable to use complexing agents which prevent spontaneous precipitation of the corresponding hydrolysates following addition of water. WO 92/21729 specifies suitable complexing agents which may be used with reactive hydrolysable compounds.

Regarding examples of hydrolysable groups A in the starting compounds (which need not necessarily be used as monomeric compounds but may be used already in the form of corresponding precondensates of compounds of one or more of the elements M) and of non-hydrolysable groups B and B', respectively, refer to the abovementioned WO 92/21729.

Particularly preferred non-hydrolysable groups B are not only those specified in WO 92/21729 which possess at least one unsaturated, polymerizable group but also those which have at least one other functional group via which crosslinking of the condensates is possible. These functional groups may be, for example, hydroxyl, epoxy or substituted or unsubstituted amino groups. Preference is given here to epoxy groups, especially glycidyloxy-$C_{1-4}$-alkyl groups such as glycidyloxypropyl. As groups containing unsaturated carbon-carbon bonds, mention may be made of groups which possess a (meth)-acryloyloxy radical, particularly a (meth)acryloyloxy-$C_{1-4}$-alkyl radical such as (meth) acryloyloxypropyl.

In accordance with the invention it is preferred if the total molar ratio of groups A to groups B in all starting compounds (including the fluorinated ones) is from 10:1 to 1:2, more preferably from 8:1 to 1:1 and in particular from 7:1 to 2:1. It should be borne in mind that this ratio relates to monomeric starting compounds, and so must be appropriately converted in the case of precondensates that are used.

Specific examples of non-fluorinated and fluorinated hydrolysable compounds are given in WO 92/21729. Particularly the silicon compounds that can be used in accordance with the invention may be used in whole or in part in the form of precondensates, i.e. compounds which have come about by partial hydrolysis of the corresponding monomeric compounds, either alone or in a mixture with hydrolysable compounds of other elements.

In the coating compositions used in accordance with the invention it is possible for all, but at least 0.1 mol %, of the non-hydrolysable groups B attached to the elements M to be the groups B' which have on average from 5 to 30 fluorine atoms which are attached to one or more aliphatic (including cycloaliphatic) carbon atoms distanced from M by at least two atoms. Preferably from at least 1 to 50 mol % and in particular from 2 to 30 mol % of the groups B are groups B', with a particularly preferred percentage being situated within the range from 5 to 25 mol %.

Preferably, the groups B' contain an average of 5 to 25 and in particular from 8 to 18 fluorine atoms attached to aliphatic carbon atoms, without taking into account those fluorine atoms which may be attached otherwise, for example to aromatic carbon atoms (e.g. in the case of $C_6F_4$). The fluorinated groups B' may also be a chelate ligand. It is likewise possible for one or more fluorine atoms to be sited on a carbon atom from which a double or triple bond extends. Since the group B' is required to have only an average of five corresponding fluorine atoms, it is also possible to use groups B' which possess only 1 fluorine atom provided that at the same time there are sufficient groups B' which have more than 5 fluorine atoms.

Especially if the groups B in the condensates of the coating composition include those containing unsaturated carbon-carbon bonds, or functional groups likewise suitable for the crosslinking of the condensates, the coating composition of the invention preferably also includes a catalyst for a thermal and/or photochemically induced cure. Examples of amount and nature of the catalysts in the case of unsaturated carbon-carbon bonds are described in WO 92/21729. Preferred catalysts in this context are photopolymerization initiators. The stated amounts and types may also be used when other functional groups are present. In the presence of epoxide groups, for example, it is also possible to use Cyracure® (produced by Union Carbide) as a catalyst.

The coating composition is prepared in the manner customary in this field. Where predominantly silicon compounds (which are relatively slow to react in the hydrolysis) are used at the beginning, the hydrolysis in the majority of cases may take place by adding water directly (preferably with stirring) to the silicon compound(s) to be hydrolysed, which are present either as such or in solution in an appropriate solvent, at room temperature or with slight cooling and then stirring the resulting mixture for a certain time (a few minutes to a few hours). Where the more reactive compounds of, for example, Al, Ti and Zr are present, it is generally advisable to add the water in stages. Irrespective of the reactivity of the compounds present, the hydrolysis takes place in general at a temperature not above 50° C., preferably between 0° C. and 30° C. Especially in the case of the less reactive hydrolysable starting compounds, it is also possible to use condensation catalysts. These are, for example, bases or, preferably acids.

In principle, it is not necessary to use a solvent, especially when the hydrolysable groups A are groups which in the course of the hydrolysis lead to the formation of (lower) alcohols, such as methanol, ethanol, propanol and butanol, for example. In other cases (for example when using halosilanes) examples of suitable solvents are the aforementioned alcohols and also ethers, preferably lower dialkyl ethers such as diethyl ether and dibutyl ether and THF, aromatic hydrocarbons (e.g. toluene), esters such as ethyl acetate, and in particular butoxyethanol. Of course, a solvent may be used even if the hydrolysis leads exclusively to (lower) alcohols as by-product.

As far as the total amount of water to be used for the hydrolysis is concerned, it is noted that it is particularly preferred if the molar ratio of total added water to hydrolysable groups A in all starting compounds used is situated in the range from 3:1 to 0.2:1, in particular from 2:1 to 0.3:1. In addition, it is also possible to employ the specific process described in WO 92/21729.

Especially if the groups B and/or B' contain at least one carbon-carbon double or triple bond and/or another functional group via which crosslinking of the condensates is possible, it is appropriate for one or more organic compounds containing at least one carbon-carbon double or triple bond or at least one functional group via which crosslinking of the condensates is possible to be present in the coating composition as well. Examples of organic compounds of this kind are compounds containing acryloyloxy, methacryloyloxy, glycidyloxy, epoxide, hydroxyl and/or amino group. The organic compound preferably contains one or two such groups.

Examples of organic compounds that may be used if the groups B and/or B' contain at least one carbon-carbon double or triple bond are styrene, acrylic acid, methacrylic acid and derivatives thereof (e.g. esters, amides, nitriles). These organic compounds may additionally carry further functional groups, examples being OH groups.

Examples of organic compounds which may be used if the groups B and/or B' contain at least one functional group via which crosslinking of the condensates is possible are, for example, aliphatic diepoxides having from 5 to 30 carbon atoms or cycloaliphatic or aromatic diepoxides having from 10 to 40 carbon atoms.

In particular if the coating composition is prepared without solvents and with addition of water in the lower region of the inventively preferred range, it may be necessary to dilute the coating composition with an appropriate organic solvent prior to its application.

Particularly suitable for this purpose are toluene, ethyl acetate, THF, butyl glycolate, butoxyethanol, ethylene glycol monoethyl and diethyl ether, and mixtures thereof. Where the coating composition is diluted with a solvent, the proportion of coating components (excluding nanoparticles) to solvent is preferably in the range from 1:0.5 to 1:2.

Where curing of the coating composition by irradiation is intended, a photoinitiator must be added to the coating composition prior to its application. With preference, an initiator is also added if curing by thermal means is intended.

To produce the microstructured surface, the coating composition for the surface layer or a starting material or intermediate thereof may have added to it nanoscale inorganic particulate solids having a particle size of at least 50 nm (nanoparticles). They are added before the coating composition is applied to the substrate. The nanoparticles may be added to the finished coating composition or even to the hydrolysable starting compounds before the hydrolysis or at an intermediate point in time i.e. to a precursor.

The nanoscale inorganic particulate solids, such as are described for example in WO 93/06508, may consist of any desired materials; preferably, however, they are of metals and in particular of metal compounds such as, for example, (optionally hydrated) oxides such as ZnO, CdO, $SiO_2$, $TiO_2$, $ZrO_2$, $CeO_2$, $SnO_2$, $Al_2O_3$ (especially boehmite), $In_2O_3$, $La_2O_3$, $Fe_2O_3$, $Cu_2O$, $Ta_2O_5$, $Nb_2O_5$, $V_2O_5$, $MoO_3$ or $WO_3$; chalkogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (e.g. those having perovskite structure such as $BaTiO_3$ and $PbTiO_3$). The nanoparticles may be added, for example, in the form of powders or sols. They may be spherical, elongate or of any desired other form.

The particulate solids or agglomerates used have a particle size of at least 50 nm. The use of smaller primary particles is possible if they are present in the surface layer in the form of aggregates or agglomerates having a particle size of at least 50 nm. The particulate solids or agglomerates may have a particle size, for example, of up to 10 μm, preferably up to 4 μm and with particular preference up to 1 μm.

The contact angle with respect to water and hexadecane and hence the microstructuring of the surface may be adjusted within the desired range by way, for example, of the degree of filling, i.e. the nanoparticle content of the coating composition.

Nanoparticles also. serve to improve the mechanical properties; in particular, enhanced abrasion resistance and scratch resistance of the microstructured surface is achieved.

At a point no later than the application of the coating composition, it is possible if desired for customary coating additives to be added to it, examples being colorants, fillers, oxidation inhibitors, levelling agents, UV absorbers and the like.

The coating composition, provided if appropriate with an initiator and other additives, is then applied to an appropriate substrate. Customary coating techniques may be used for this coating, examples being dipping, flow coating, drawing, casting, spin coating, squirting, spraying, brushing, rolling or conventional printing techniques. Particular preference in accordance with the invention is given to spraying, squirting and spin coating.

Alternatively, the inicrostructured surface may be obtained by embossing the coating composition applied to the substrate, before or during drying and/or curing, with an embossing die having a non-polar and/or low-energy surface.

The embossing die has a non-polar and/or low-energy surface. In this way it is surprisingly possible, with the coating compositions used in accordance with the invention, to produce microstructured surfaces having a high contact angle. Normally in fact, embossing produces a microstructure which does not exhibit high contact angles but instead exhibits substantially smaller contact angles. Without being tied to any one theory, it is assumed that, in the course of embossing, the fluorinated side groups of the coating composition are surprisingly not, as usual, pressed into the substrate owing to their thermodynamic interaction with the embossing-die surface, with the result that, surprisingly, the amount of fluorinated groups on the surface is not decreased as a result of the embossing.

The embossing die comprises, for example, a die made of silicone rubber. On its surface, the embossing die has the negative of the desired microstructure.

Before curing, the applied coating composition is preferably dried, for example at room temperature or slightly increased temperature. The layer thickness in the dried/cured state is preferably at least 50 nm, with particular preference at least 200 nm and in particular at least 500 nm. The layer thickness may, for example, be up to 100 $\mu$m, preferably up to 50 $\mu$m and in particular up to 20 $\mu$m. After the drying which may be performed, the coating composition applied to the substrate may be cured conventionally by thermal means and/or by irradiation (e.g. using UV, laser or electron beams) depending on the nature and presence of an initiator. It may, however be that simple drying (at room temperature) is sufficient, so that there is no need for carrying out any further particular curing.

In the case of thermal curing, the curing temperatures are preferably at least 50° C., in particular at least 90° C. One of the determinants of the maximum curing temperature is the thermal load-bearing capacity of the substrate that is to be coated. In the case of glass or metals it is possible to use curing temperatures of up to 350° C. Preferably, however, curing temperatures of 200° C. and in particular 180° C. will not be exceeded. The curing time is generally from 1 to 2 hours.

The microstructured surfaces obtainable with the method of the invention are notable in particular for an outstanding anti-adhesion effect with respect to a very wide variety of forms of soiling; in particular, they are easy to clean of stains such as fats and oils, so that they may be used in practice as easy-to-clean systems.

Particularly in view of their good adhesion to glass and their transparency, the coating compositions of the invention are outstandingly suitable for the coating of glasses on which a dirt-, water- and oil-repellent surface is desirable, for example for the coating of (exterior) mirrors of motor vehicles, but also, for example, of windscreens, or of metals such as aluminium. Further fields of application are, for example, plastics and painted surfaces, such as those in the automotive sector.

The examples which follow illustrate the invention without restricting it.

EXAMPLE 1

17.17 g (0.2 mol) of methacrylic acid are slowly added with stirring to 80.96 g (0.2 mol) of zirconium(IV) n-propoxide (78.46% by weight in 1-propanol) and the mixture is stirred for 30 minutes (solution A). 248.11 g (1 mol) of methacryloyloxypropyltrimethoxy-silane, 23.01 g (1.278 mol) of distilled water and 4 g (0.222 mol) of 0.1 n HCl solution are mixed and stirred for 30 minutes (solution becomes a single phase after about 15 minutes). The solution A, prepared beforehand, is added dropwise over the course of 20 minutes, with ice/water cooling, and then the sol is stirred for 60 minutes. This is followed by subsequent hydrolysis by the addition of a further 5.37 g (0.298 mol) of distilled water. After 60 minutes of stirring, 10.208 g (0.02 mol) of 1H,1H,2H,2H-perfluorooctyltriethoxysilane (FTS) are added and the sol is again stirred for 1 h. This is followed again by the addition of 0.554 g (0.031 mol) of distilled water. Finally, 2.45 g (0.012 mol) of photoinitiator (Irgacure 184) are added and stirring is continued for 1 h.

The undiluted sol is spin-coated onto a glass substrate (at 1000 rpm) and embossed under a vacuum of 30 mbar with a silicone die measuring 3×3 cm having an impressed moth's eye structure with a periodicity of 280 nm (preload 50 N, embossing load 100 N) and during the embossing operation is cured for 10 minutes with UV light. The resulting microstructured coating exhibits structure heights of from 40 to 70 nm (AFM measurement); the contact angle with respect to water is 130°, that with respect to hexadecane is 70°; and the transparency in the wavelength range between 400 and 700 nm is 95%. A comparative specimen produced without embossing had a contact angle with respect to water of 105° and with respect to hexadecane of 50°.

EXAMPLE 2

41.6 g (0.2 mol) of tetraethoxysilane (TEOS), 35.6 g (0.2 mol) of methyltriethoxysilane (MTEOS), 26.0 g (0.051 mol) of 1H,1H,2H,2H-perfluorooctyltriethoxy-silane (FTS), 10.4 g of aqueous silica sol (from Bayer, type KS 300/30), 98.0 g of isopropanol and 81.0 g of 40% strength by weight formic acid are stirred in a glass beaker for 60 minutes. A suspension of 40 g of isopropanol and 2 g of nanoscale $SiO_2$ (34 mol % Aerosil MOX 80, primary particle size 30 nm) is added to 50 g of the first mixture. The mixture contains agglomerates with a size of 100–500 nm (transmission electron micrograph (TEM) and ultrafine particle analyser (UPA)).

The suspension is applied to glass substrates by spraying and dried at 350° C. for 1 h. The contact angles of the films are determined using the drop method and a goniometer. The roughnesses $R_a$ are determined with a scanning force microscope (AFM, nm range) or with a profilometer ($\mu$m range). In the case of the comparative specimen, isopropanol only was added to the silane mixture.

| Particles | Contact angle, water [°] | Contact angle, hexadecane [°] | Appearance, roughness |
|---|---|---|---|
| None (comparative) | 100 | 60 | uniform, Ra = 0.39 nm (AFM) |
| $SiO_2$ Aerosil MOX 80 | 165 | 84 | uniform, Ra = 890 nm (profilometer) |

EXAMPLE 3

10.4 g (0.05 mol) of tetraethoxysilane (TEOS), 8.9 g (0.05 mol) of methyltriethoxysilane (MTEOS), 5.1 g (0.01 mol) of 1H,1H,2H,2H-perfluorooctyltriethoxysilane (FTS), and 6.0 g of ethanol are stirred in a glass beaker for 5 minutes. Then 4.24 g of 30% strength by weight acetic acid are added with vigorous stirring. The initially two-phase reaction mixture warms up within a few seconds and becomes a single phase, giving off heat as it does so. Following a reaction period of about 30 minutes, a nanoscale powder (for weight and type see following table) is stirred into 20 g of this mixture, forming translucent ($SiO_2$) to opaque ($TiO_2$) suspensions. In the suspensions, the primary particles are agglomerated to give particles of 100–500 nm in size (transmission electron micrograph (TEM) and ultrafine particle analyser (UPA)).

The suspensions are applied to glass and aluminium substrates by spin coating and are dried at 250° C. for 1 h.

| Particles (g to 20 g of mixture) | Contact angle, water [°] | Contact angle, hexadecane [°] | Appearance |
| --- | --- | --- | --- |
| No particles (comparative) | 105–110 | 60–65 | transparent, uniform |
| 0.5 g TiO$_2$ | 155–160 | 80–85 | translucent, uniform |
| 8.6 g TiO$_2$ | 160–170 | 80–85 | translucent, uniform |
| 0.19 g SiO$_2$ (Aerosil R812) | 140 | 100–105 | translucent, uniform |
| 0.38 g SiO$_2$ (Aerosil R812) | 140–145 | 100–105 | translucent, uniform |
| 0.19 g SiO$_2$ (Aerosil R974) | 145–150 | 105–110 | translucent, uniform |
| 0.38 g SiO$_2$ (Aerosil R974) | 155 | 115–120 | translucent, uniform |

What is claimed is:

1. A substrate having a microstructured surface layer, the layer:

(a) comprising a composition comprising:
a condensate of at least one hydrolyzable compound of at least one element M selected from elements of the main groups III through V and transition groups II through IV of the periodic table,
at least a part of this at least one hydrolyzable compound containing hydrolyzable groups A and non-hydrolyzable, carbon-containing groups B,
where the total molar ratio of hydrolyzable groups A to non-hydrolyzable, carbon-containing groups B in the at least one hydrolyzable compound is between 10:1 and 1:2, and
where between 0.1 mol % and 100 mol % of the non-hydrolyzable, carbon-containing groups B are groups B' that contain on average between 5 and 30 fluorine atoms that are attached to aliphatic carbon atoms at least two atoms distant from M, and (b) having a microstructuring such that the contact angle of the microstructured surface layer with respect to water or hexadecane is at least 5° higher than the contact angle of a corresponding non-microstructured surface layer.

2. A substrate having a microstructured surface layer of claim 1, where the at least one element M is selected from the group consisting of Si, Al, B, Pb, Sn, Ti, Zr, V, Zn, and mixtures thereof.

3. A substrate having a microstructured surface layer of claim 2, where the at least one element M is Si, either alone or in combination with at least one of Al, Ti, and Zr.

4. A substrate having a microstructured surface layer of claim 1 where between 1 mol % and 100 mol % of the non-hydrolyzable, carbon-containing groups B contain at least one unsaturated, polymerizable group.

5. A substrate having a microstructured surface layer of claim 1, where the surface layer composition further comprises a polymerization product of a free-radical polymerizable monomer.

6. A substrate having a microstructured surface layer of claim 1, where the contact angle of the microstructured surface layer with respect to water or hexadecane is at least 10° higher than the contact angle of a corresponding non-microstructured surface layer.

7. A substrate having a microstructured surface layer of claim 1, where the contact angle of the microstructured surface layer with respect to water is at least 120°.

8. A substrate having a microstructured surface layer of claim 1, where the contact angle of the microstructured surface layer with respect to hexadecane is at least 70°.

9. A substrate having a microstructured surface layer of claim 1, where the substrate is selected from the group consisting of glass, metals, plastics, and painted surfaces.

10. A method of producing a substrate having a microstructured surface layer of claim 1, the method comprising the steps of:

(A) applying to the substrate a composition comprising:
a condensate of at least one hydrolyzable compound of at least one element M selected from elements of the main groups III through V and transition groups II through IV of the periodic table,
at least a part of this at least one hydrolyzable compound containing hydrolyzable groups A and non-hydrolyzable, carbon-containing groups B,
where the total molar ratio of hydrolyzable groups A to non-hydrolyzable, carbon-containing groups B in the at least one hydrolyzable compound is between 10:1 and 1:2, and
where between 0.1 mol % and 100 mol % of the non-hydrolyzable, carbon-containing groups B are groups B' that contain on average between 5 and 30 fluorine atoms that are attached to aliphatic carbon atoms at least two atoms distant from M, (B) embossing the composition with an embossing die having a non-polar and/or low energy surface to form a microstructured composition, (C) optionally drying the composition, and (D) curing the composition, thereby forming the substrate having a microstructured surface layer; where embossing step (B) may occur before and/or during optional drying step (C) and/or before and/or during curing step (D).

11. A method of producing a substrate having a microstructured surface layer of claim 1, the method comprising the steps of:

(A) applying to the substrate a composition comprising:
a condensate of at least one hydrolyzable compound of at least one element M selected from elements of the main groups III through V and transition groups II through IV of the periodic table, and
nanoscale inorganic particulate solids or agglomerates having a particle size of at least 50 nm,
at least a part of this at least one hydrolyzable compound containing hydrolyzable groups A and non-hydrolyzable, carbon-containing groups B,
where the total molar ratio of hydrolyzable groups A to non-hydrolyzable, carbon-containing groups B in the at least one hydrolyzable compound is between 10:1 and 1:2, and
where between 0.1 mol % and 100 mol % of the non-hydrolyzable, carbon-containing groups B are groups B' that contain on average between 5 and 30 fluorine atoms that are attached to aliphatic carbon atoms at least two atoms distant from M, (B) optionally drying the composition, and (C) curing the composition, thereby forming the substrate having a microstructured surface layer.

* * * * *